United States Patent [19]

Chan

[11] Patent Number: 5,029,168
[45] Date of Patent: Jul. 2, 1991

[54] MULTIPLEXING COMMUNICATION CARD AND SCANNING METHOD FOR RUN-IN TESTING

[75] Inventor: Wai-Yip T. Chan, Hsin Chu City, Taiwan

[73] Assignee: Acer Incorporated, Taipei, Taiwan

[21] Appl. No.: 316,275

[22] Filed: Feb. 27, 1989

[51] Int. Cl.⁵ .............................................. G06F 11/00
[52] U.S. Cl. .................. 371/16.1; 371/22.1; 324/73.1
[58] Field of Search .................. 371/16.1, 22.1; 324/73.1, 158 F; 370/112, 85.1, 85.8, 95.2; 340/825.07, 825.08, 825.54

[56] References Cited

U.S. PATENT DOCUMENTS

| | | | |
|---|---|---|---|
| 4,285,052 | 8/1981 | Bobbitt | 370/112 |
| 4,285,057 | 8/1981 | Sbuelz | 370/112 |
| 4,328,759 | 9/1982 | Schnurmann | 324/73.1 |
| 4,403,297 | 9/1983 | Tivy | 324/73.1 |
| 4,504,943 | 3/1985 | Nagano et al. | 370/112 |
| 4,710,919 | 12/1987 | Oliver et al. | 370/95.1 |
| 4,714,875 | 12/1987 | Bailey et al. | 324/73.1 |
| 4,866,714 | 9/1989 | Adams et al. | 371/22.1 |
| 4,896,055 | 1/1990 | Fujii et al. | 324/73.1 |
| 4,899,306 | 2/1990 | Greer | 371/16.1 |

Primary Examiner—Jerry Smith
Assistant Examiner—Phung My Chung
Attorney, Agent, or Firm—Townsend and Townsend

[57] ABSTRACT

A multiplexing communication card and run-in testing method and apparatus are disclosed. A group of PC's are provided with a primary multiplexing communication card. The primary multiplexing communication card is connected with the host computer, and the secondary cards are serially connected to each other. Communication between the individual PC's with the host computer go through not only the primary multiplexing communication card but also the secondary multiplexing communication cards. The host computer scans each PC under test through the primary multiplexing communication card and the number of the testing cycle and the test results are transmitted to and displayed on the monitor of the host computer.

3 Claims, 2 Drawing Sheets

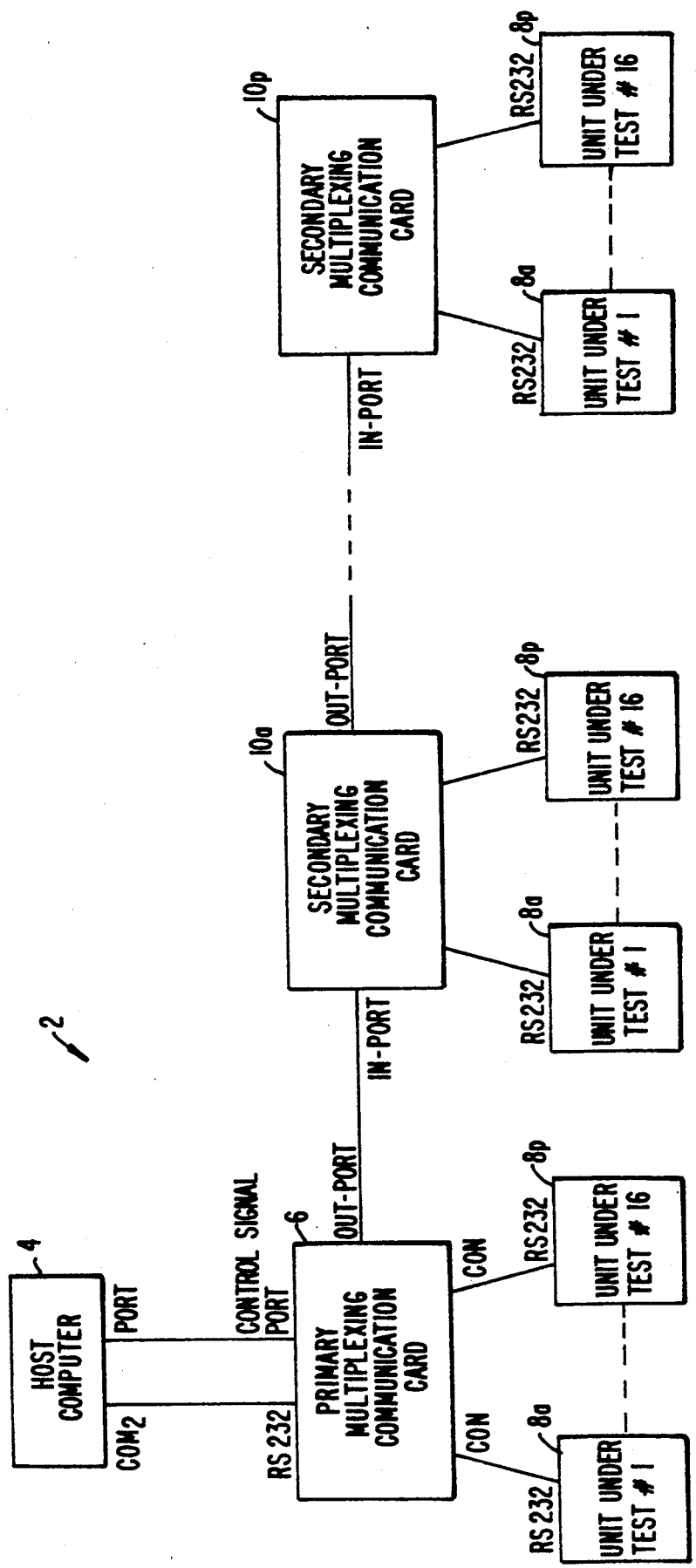
FIG._1.

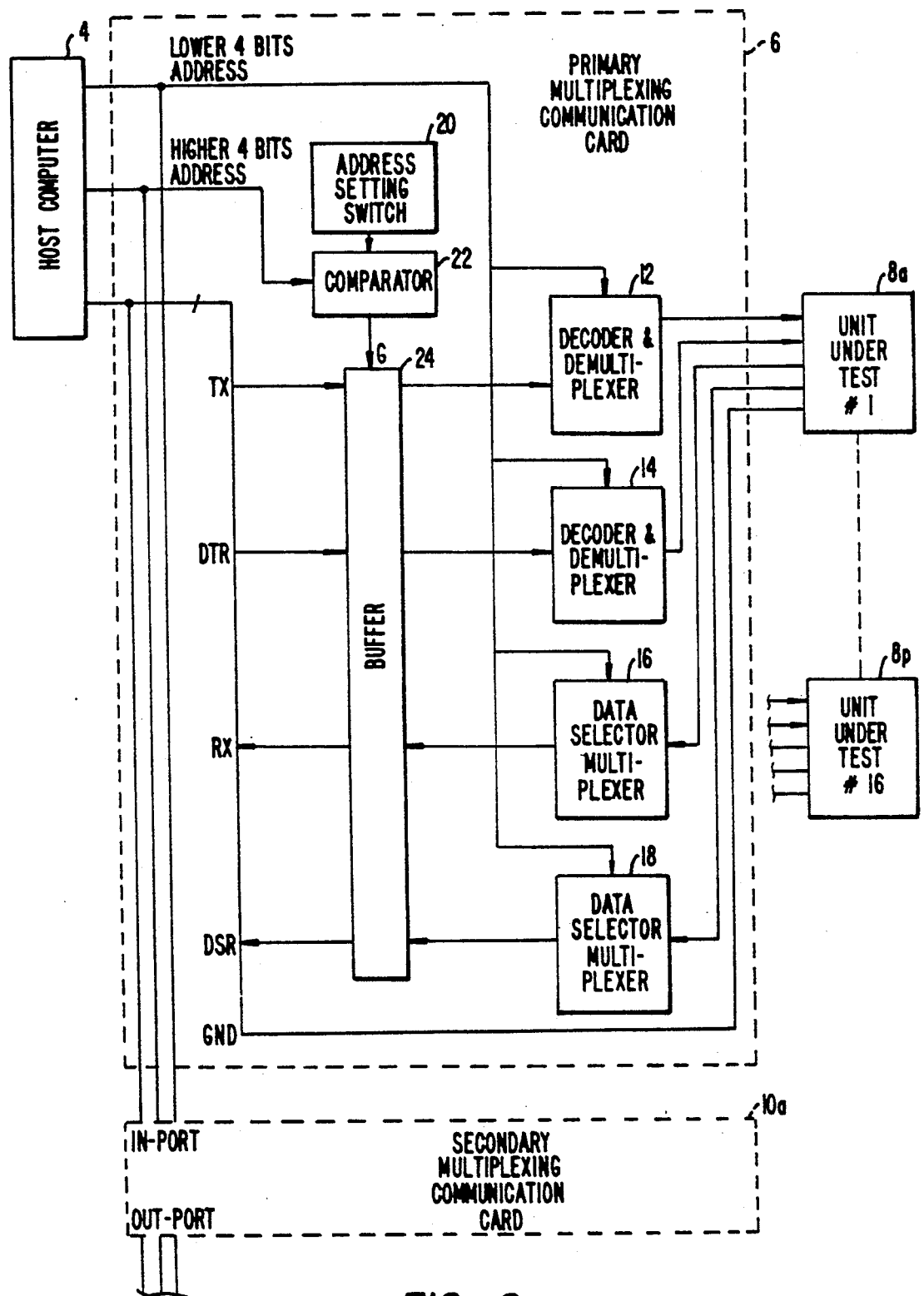
FIG._2.

MULTIPLEXING COMMUNICATION CARD AND SCANNING METHOD FOR RUN-IN TESTING

BACKGROUND OF THE INVENTION

1. Field of the Invention

The present invention is related to the field of computer manufacturing. In particular, the present invention provides a method and apparatus for run-in testing of computers.

2. Description of Related Art

In the computer manufacturing process, and especially the manufacturing process for personal computers (PC's), it has been well known to use a so-called "burn-in" and/or "run-in" test when the computer is completed. In the burn-in test the temperature reliability of a PC motherboard is tested. Power is applied in a closed environment with a temperature of about 70°-80° C. for about 48 hours. In the run-in test software such as the "Advanced Diagnostics" software provided by IBM is utilized to test the run-in condition of a personal computer. The test may be conducted, for example, for about 8 hours.

In the past, most PC testing has been done on a unit-by-unit basis. In other words, a testing inspector collects the results from the burn-in and run-in test from each PC individually.

As the demand for PC's has risen, PC manufacturers have devised and utilized automated equipment and processes for the manufacture of PC's. These processes have resulted in greatly increased production rates for PC's. However, the testing procedures for these PC's remains largely non-automated and, consequently tedious and time consuming. Often, PC testing procedures act as the bottleneck of PC throughput.

SUMMARY OF THE INVENTION

The present invention provides a multiplexing communication card and scanning system for testing and monitoring the test results of many PC's using a single host computer and monitor. The invention greatly speeds the collection speed of test results, reducing the potential for a bottleneck in the manufacturing process.

A multiplexing communication card and scanning system are used for monitoring the PC run-in test. A group of PC's are loaded onto a suitable moving cart, conveyor belt, or the like. A single multiplexing communication card is provided for each group of PC's and is connected to a host computer. Communications between the PC and the host computer pass through the multiplexing card for the group of PC's. The host computer scans each PC in the test group. The number of the testing cycle and the test results are transmitted to and displayed on a monitor of the host computer.

BRIEF DESCRIPTION OF THE DRAWINGS

FIG. 1 is a block diagram of the scanning system.
FIG. 2 is a detailed block diagram of the multiplexing communication card.

DETAILED DESCRIPTION OF THE INVENTION

FIG. 1 illustrates a scanning/test system 2. A host computer 4 is programmed with control software of the type known to those of skill in the art to execute a run-in test. Software such as "Advanced Diagnostics," IBM (1984) may, for example, be utilized.

The host computer 2 communicates with a primary multiplexing communication card 6 by connecting a PRT port of the host computer to a control signal port of the multiplexing communication card. The connection between the control signal port and the PRT (printer) port serves to transmit control signals between the primary multiplexing communication card and the host computer. A COM 2 (communication) port of the host computer is connected to an RS 232 port (serial interface) of the primary multiplexing card. The connection between the COM 2 and RS 232 ports is utilized for command and data signal transmission.

The primary multiplexing communication card may be connected to any number of PC's (for example 32 or 64), but for the sake of example herein, the primary card is connected to 16 PC's.

The primary multiplexing card 6 has additional connections (herein referred to as "CON") for connecting with the RS 232 interfaces port of PC's 8a to 8p for the purposes of control, command, and data transmission.

In addition to the above-described connections, the primary multiplexing card 6 includes an out-port for connection with the in-port of a secondary multiplexing card 10a. Additional secondary multiplexing cards 10b to 10p are provided (only PC's 8a and 8p are shown in FIG. 1 for simplicity and, similarly, only secondary multiplexing cards 10a and 10p are shown) and are serially connected by connecting the out-port of the prior secondary multiplexing card to the in-port of the adjacent card. Sixteen multiplexing cards are utilized for illustration herein, but the invention could readily be utilized with a higher number of secondary multiplexing cards and, hence, any number of PC's. For example, the invention could readily be expanded for use with 32 or 64 secondary multiplexing communication cards and PC's.

FIG. 2 illustrates the primary multiplexing communication card 6 in greater detail.

The primary multiplexing communication card 6 includes decoder/demultiplexers 12 and 14 and data selector/multiplexers 16 and 18 for inputting the lower four bit's address signals from the PRT port of the host computer to select a specified RS 232 port of the PC's 8a-8p as a signal transmission interface.

The primary multiplexing communication card 6 also includes an address setting switch 20 which is used to define and input the address of the multiplexing communication card into a comparator 22. Comparator 22 also has as input the higher four bits address signals from the PRT port of the host computer 4. If the address signal of the higher four bits is equal to the value from the address setting switch, the comparator outputs an enable signal to buffer 24 for outputting the inputted signal thereto. The command and data signals outputted from the host computer 2 are inputted to the buffer 24 through the TX, DTR, GND pins of the RS 232 interface, and the buffer 24 outputs the signals to the decoder/demultiplexers 12 and 14, respectively. By controlling the lower four bits address signals, the decoder/demultiplexers 14 and 16 output the signals to the RS 232 interface defined by the lower four bits address, so the signals are inputted to the specified PC (8a, or 8b or...8p). The signals of the test results are inputted to the buffer 24 through data selector/multiplexers 16 and 18. By the use of RX and DSR pins the signals are sent back to the host computer 4.

The secondary multiplexing communication card 10a is the same as the primary multiplexing communication 6 except that communication between the host computer 4 and other secondary multiplexing communication cards 10b, 10e . . . 10p is achieved by the connection between the outport of the primary multiplexing card 6 and the in-port of the secondary multiplexing communication card 10a. Therefore, when the PC's interfaced with the secondary multiplexing communication cards 10b, 10c . . . 10p send test results back to host computer 4, the signals must go through the RS 232 of the primary multiplexing communication card 6.

When the specified higher four bits address signal, inputted from the host computer 4 to the comparator 22, is equal to the preset value of the setting switch 20, the comparator 22 then enables the buffer 24 by sending the enable signal; in the mean time, the host computer 4 outputs the lower four bits address signals to decoder/demultiplexers 12 and 14, and data selector/ multiplexers 16 and 18, and sets the DTR pin ON. Using the lower four bits address signal as the multiplexing signal, the DTR ON signal is outputted from decoder/ demultiplexer 14 to specified PC 8a, 8b, . . . 8p. If the specified PC is connected correctly, it outputs a DSR ON signal to host computer 4 through buffer 24 and data selector/multiplexer 18. This is a handshaking procedure between the host computer 4 and the specified PC. After the handshaking is successful, the host computer 4 sends out software instructions to the specified PC through the TX pin, the buffer 24 and decoder/demultiplexer 12. The requested test results are then sent back to the host computer 4 for display on the monitor. After receiving the request, the specified PC outputs its testing results to host computer 4 for display through data selector/multiplexer 16, buffer 24, and RX pin of RS 232.

It is to be understood that the above description is intended to be illustrative and not restrictive. The scope of the invention should, therefore, be determined not with reference to the above description but, instead, should be determined with reference to the appended claims along with their full scope of equivalents.

What is claimed is:

1. Apparatus for performing a run-in test in a plurality of computers comprising:
   a) a host computer for transmitting control and data signals;
   b) a primary multiplexing means coupled to said control and data signals at an input port; and
   c) at least two secondary multiplexing means, each having an input port and an output port and a test port, a first of said secondary multiplexing means having its input port connected to an output port of said primary multiplexing means, a second of said secondary multiplexing means having its input port connected to said output port of said first secondary multiplexing means and wherein said primary multiplexing means further comprises
      i) an address setting switch;
      ii) a comparator for comparing an address from said switch to an address signal from said host computer and outputting an enable signal to a buffer when said address from said switch and said address from said host computer are equal, said buffer connected to said host computer to receive said control and data signals therefrom based on said enable signal;
      iii) decoder and demultiplexer means for inputting a second address signal from said host computer to select a specified unit under test and input signals from said buffer means to said specified unit; and
      iv) data selector and multiplexer means for inputting said second address signal from said host computer, and inputting control and data signals from said unit.

2. A multiplexing means, comprising:
   a) an address setting switch for setting an address of said multiplexing means and outputting the value of address;
   b) comparator means for comparing said value of address to a first address signal from a host computer, and outputting an enable signal when said address values are equal;
   c) buffer means connected with said host computer to receive control and data signals based on said enable signal;
   d) decoder/demultiplexer means for inputting a second address signal from said host computer to select a specified unit under test, and for inputting signals from said buffer means to output those signals to said specified unit under the control of said second address signal; and
   e) data selector/multiplexer means for inputting said second address signal from a host computer to select the specified unit under test, and inputting control and data signals from said specified unit and outputting those signals to said buffer means based on said second address signal.

3. A system for conducting a run-in test, comprising:
   a) a host computer for transmitting a control signal using a PRT port and transmitting command and data signals using a COM 2 port;
   b) primary multiplexing communication means having a control signal port electrically connected with said PRT port of said host computer, an RS 232 port electrically connected with said COM 2 port of said host computer and an out-port, and further comprising
   c) a plurality of secondary multiplexing communication means having an in-port and out-port, said secondary multiplexing communication means being serially connected to each other, said in-ports connected to said out-ports of an upstream secondary multiplexing communication means for signal transmission, a first of the said secondary multiplexing communication means being connected with the out-port of the primary multiplexing communication means; and
   d) said secondary multiplexing communication means having connectors electrically connected with an RS 232 interface of a unit under test, whereby signal transmission occurs between the said host computer and said units under test wherein said primary and secondary multiplexing communication means each comprise:
      i) an address setting switch for setting an address of each multiplexing communication means and outputting a value of a given address therefrom;
      ii) comparator means for inputting the value of the given address, and inputting a first address signal from said host computer, and outputting an enable signal therefrom when the value of said given address and a value of said first address signal from said host computer are equal;
      iii) buffer means coupled to said host computer for receiving command, status, and data signals under control of said enable signal;

iv) decoder/demultiplexer means for inputting a second address signal from said host computer to select a specified unit under test, and for inputting signals from said buffer means to output those signals to said specified unit under control of said second address signal; and v) data selector/multiplexer means for inputting said second address signal from the said host computer to select the specified unit under test and inputting said command, status, and data signals from said specified unit and outputting those signals to said buffer means under the control of second address signal.

* * * * *